United States Patent
Strom et al.

(10) Patent No.: US 7,152,166 B2
(45) Date of Patent: Dec. 19, 2006

(54) DIGITAL RIGHTS MANAGEMENT (DRM) ENCRYPTION AND DATA-PROTECTION FOR CONTENT ON DEVICE WITHOUT INTERACTIVE AUTHENTICATION

(75) Inventors: Clifford P. Strom, Redmond, WA (US); Krishnamurthy Ganesan, Redmond, WA (US); Jonas Fredrik Helin, Järfägen (SE)

(73) Assignee: Microsoft Corporation, Redmond, WA (US)

( * ) Notice: Subject to any disclaimer, the term of this patent is extended or adjusted under 35 U.S.C. 154(b) by 911 days.

(21) Appl. No.: 10/183,933

(22) Filed: Jun. 26, 2002

(65) Prior Publication Data

US 2004/0003267 A1  Jan. 1, 2004

(51) Int. Cl.
H04L 9/132 (2006.01)
H04N 7/167 (2006.01)

(52) U.S. Cl. ................................. 713/193; 380/200
(58) Field of Classification Search ............. 713/193; 380/200
See application file for complete search history.

(56) References Cited

U.S. PATENT DOCUMENTS

| | | | |
|---|---|---|---|
| 5,715,403 A | 2/1998 | Stefik | 395/244 |
| 6,002,772 A * | 12/1999 | Saito | 705/58 |
| 6,550,011 B1 * | 4/2003 | Sims, III | 713/193 |
| 2002/0013772 A1 * | 1/2002 | Peinado | 705/51 |
| 2002/0136407 A1 * | 9/2002 | Denning et al. | 380/258 |
| 2002/0152393 A1 * | 10/2002 | Thoma et al. | 713/189 |
| 2002/0161997 A1 * | 10/2002 | Yamasaki et al. | 713/150 |
| 2003/0140227 A1 * | 7/2003 | Asano et al. | 713/157 |

FOREIGN PATENT DOCUMENTS

| | | |
|---|---|---|
| WO | WO 00/58811 | 10/2000 |
| WO | WO 00/59150 | 10/2000 |
| WO | WO 01/52021 A1 | 7/2001 |

OTHER PUBLICATIONS

Griswold, G.N. "A Method for Protecting Copyright on Networks", *Infologic*, 1-11.
Kahn, R.E. "Deposit, Registration and Recordation in an Electronic Copyright Management System", *ARL*, Jul. 3, 2002, 6 pages.
Molotkov, S.N. et al., "On the key generation for N users in quantum cryptography", *JETP Letters*, 1995, 62(12), 959-964.
Rivest, R.L. "The RC5 encryption algorithm", *Dr. Dobb's Journal*, 1995, 20(1), 146-148.
Wheeler, D.J. "A bulk data encryption algorithm", *Cambridge Security Workshop. Fast Software Encryption*, Dec. 9-11, 1993, Publication Date 1994, 127-134, INSPEC Abstract No. C9502-6130S-023.
U.S. Appl. No. 09/892,371, filed Jun. 27, 2001, Peinado.

* cited by examiner

*Primary Examiner*—Gilberto Barrón, Jr.
*Assistant Examiner*—Ali Abyaneh
(74) *Attorney, Agent, or Firm*—Woodcock Washburn LLP

(57) ABSTRACT

To render content on a medium, a device obtains a table from the medium, obtains a private key of the device (PR-PD), indexes into an entry of the table based thereon, obtains (PU-PD(RND)) from the indexed-into entry of the table, and applies (PR-PD) to (PU-PD(RND)) to expose a random key (RND). Then, the device obtains (RND(PR-PM)) from the table, applies (RND) to (RND(PR-PM)) to expose a private key of the medium (PR-PM), obtains (PU-PM(KD)) from the license, applies (PR-PM) to (PU-PM(KD)) to expose a content key (KD), obtains (KD(content)) from the storage medium, applies (KD) to (KD(content)) to expose the content.

28 Claims, 11 Drawing Sheets

DIGITAL RIGHTS MANAGEMENT (DRM) ENCRYPTION AND DATA-PROTECTION FOR CONTENT ON DEVICE WITHOUT INTERACTIVE AUTHENTICATION

TECHNICAL FIELD

The present invention relates to an architecture for enforcing rights in digital content. More specifically, the present invention relates to such an enforcement architecture that allows access to encrypted digital content only in accordance with parameters specified by license rights acquired by a user of the digital content. Even more specifically, the present invention relates to an architecture for a device with limited communications capabilities.

BACKGROUND OF THE INVENTION

As is known, and referring now to FIG. 1, digital rights management (DRM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14 or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14. Such license rules can include the aforementioned temporal requirement, and may be embodied within a digital license 16 that the user/user's computing device 14 (hereinafter, such terms are interchangeable unless circumstances require otherwise) must obtain from the content owner or an agent thereof. Such license 16 also includes the decryption key (KD) for decrypting the digital content, perhaps encrypted according to a key decryptable by the user's computing device.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise.

As should be understood, the rules and requirements in the license 16 can specify whether the user has rights to render the digital content 12 based on any of several factors, including who the user is, where the user is located, what type of computing device the user is using, what rendering application is calling the DRM system, the date, the time, etc. In addition, the rules and requirements of the license 16 may limit the license 16 to a pre-determined number of plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 20 determining that the license 16 is valid and that the user satisfies the rules and requirements therein, the digital content 12 can then be rendered. In particular, to render the content 12, the decryption key (KD) is obtained from the license 12 and is applied to (KD (CONTENT)) from the content package 13 to result in the actual content 12, and the actual content 12 is then in fact rendered.

In a DRM system 10, content 12 is packaged for use by a user by encrypting such content 12 and associating a license 16 having a set of rules with the content 12, whereby the content 12 can be rendered only in accordance with the rules in the license 16. Because the content 12 requires the license 16 for access thereto, then, the content 12 may be freely distributed. Significantly, both the content 12 and the license 16 must be communicated to the computing device 14. Moreover, in preparing at least the license 16 for the computing device 14, information about the device 14 including cryptographic keys used thereby is normally provided to the licensor. However, and importantly, some devices 14, such as for example a portable player or a portable data assistant, can communicate with the external world in only a rudimentary manner, and therefore cannot normally be expected to participate in any substantial way to obtain the content 12 or the license 16. Accordingly, a need exists for a method and mechanism that allows the DRM system 10 to encompass a computing device 14 that perhaps cannot interact with other elements over a communications link for purposes of obtaining the content 12 and license 16. More particularly, a need exists for a version of a DRM system 10 that allows for encryption and data-protection for content on a portable medium that is introduced to the computing device 14, even though the device 14 perhaps does not have the capability to communicate with a remote entity over a network connection or the like, but can perform asymmetric key decryption.

SUMMARY OF THE INVENTION

The aforementioned needs are satisfied at least in part by the present invention in which a device has a public-private key pair (PU-PDx, PR-PDx) with a pre-selected index value x, and is for receiving a storage medium or having the storage medium. The storage medium has a public-private key pair (PU-PM, PR-PM) and has stored thereon digital content encrypted by a content key (KD) (KD(content)), a digital license corresponding to the content including (KD) encrypted by (PU-PM) (PU-PM(KD)), and a table including a plurality of entries therein. Each entry includes a random key (RND) encrypted by a (PU-PDx) of one of a plurality of devices (PU-PDx(RND)) and an index value x thereof. The table further includes (PR-PM) encrypted by (RND) (RND (PR-PM)).

For the device to render the content on the medium, the device receives a request to render the content on the medium, obtains the table from the medium, obtains (PR-PDx) and the index value x, indexes into an entry of the table based on the obtained index value x, obtains (PU-PDx (RND)) from the indexed-into entry of the table, and applies (PR-PDx) to (PU-PDx(RND)) to expose (RND). Then, the device obtains (RND(PR-PM)) from the table, applies (RND) to (RND(PR-PM)) to expose (PR-PM), obtains (PU-PM(KD)) from the license, applies (PR-PM) to (PU-PM (KD)) to expose (KD), obtains (KD(content)) from the storage medium, applies (KD) to (KD(content)) to expose the content, and renders the exposed corresponding content.

For a host computer to provide the medium with the table, such host computer obtains the table from a cache, obtains an ID of the medium therefrom, and appends the obtained ID of the medium to the obtained table. The host computer then employs a (PR-PDx) and the index value x thereof to find the corresponding entry in the obtained table and expose (RND), and ties the table to the medium by the ID of the medium and (RND). Thereafter the host computer copies the tied table to the medium.

For the host computer to store digital content and a digital license corresponding thereto on the medium, the host computer encrypts the content to be stored on the medium according to a content key (KD) (KD(content)), encrypts (KD) according to (PU-PM) (PU-PM(KD)), and places (PU-PM(KD)) in the license. The host computer thereafter stores the encrypted content and the license on the medium.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
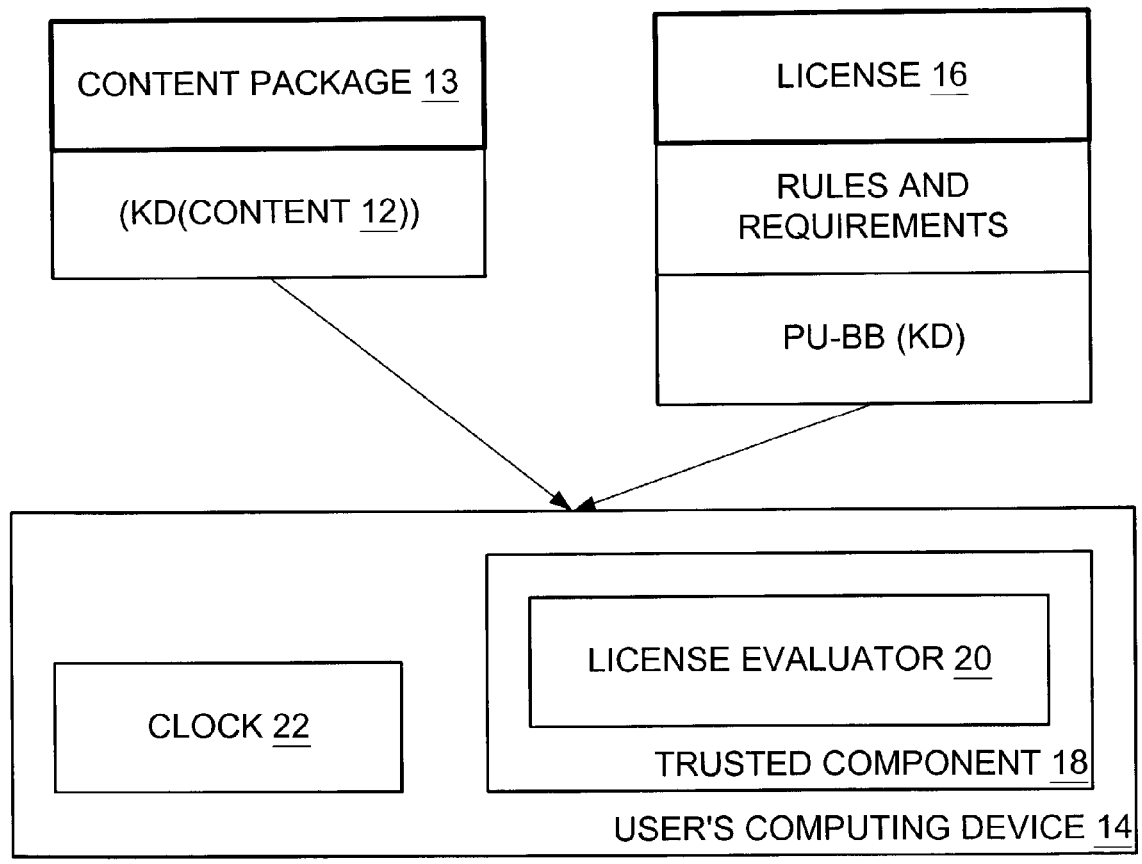
FIG. 1 is a block diagram showing an enforcement architecture of an example of a trust-based system.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
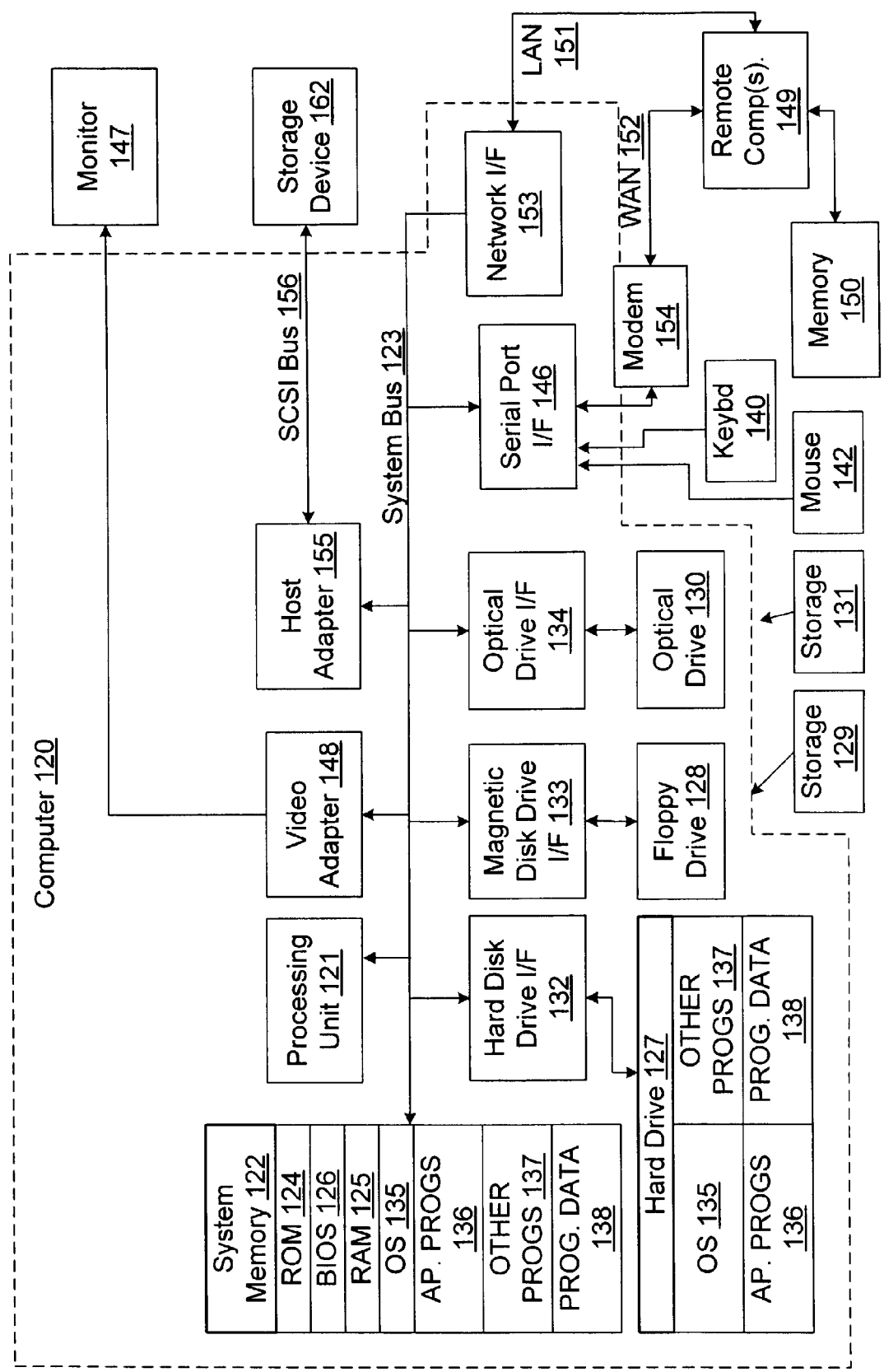
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Simplified Decryption for a Relatively Simple Device

Typically, a DRM system 10 such as has been set forth above protects digital content 12 by among other things having a user's computing device 14 authenticate itself as a legitimate DRM component and transmit one or more cryptographic keys for purposes of constructing and receiving a license 16 to render the content 12. Such authentication and key transmittal can include an interactive process including signed certificates, negotiations, exchanges of asymmetric and symmetric keys, and the like, where the interactive process is accomplished over a network connection or the like between the computing device 14 and a remote entity such as a license server.

However, it is to be appreciated that in some instances the computing device 14 upon which the content 12 is to be rendered perhaps cannot communicate with a remote entity over a network connection or the like in the interactive process set forth above. Instead, such device 14 typically can receive content 12 and the like on a storage medium or download such content 12 and the like from a host computer into an internal memory. For example, a computing device 14 which is a portable player or portable assistant may accept a storage medium and have a rudimentary user interface, but cannot normally be coupled to a network to communicate directly with a content server or license server. Accordingly, a need exists for a mechanism and method that extends the DRM system 10 to such non-connective device 14.

Briefly, in the present invention, such non-connective device 14, portable or otherwise, is presumed to be capable of performing both symmetric and asymmetric encryption and decryption, and is pre-authorized by being granted a public-private key pair (PU-PD, PR-PD) and some form of a trusted component 18, and authorization is confirmed through a table, where the trusted component 18 of the device 14 uses (PR-PD) to unlock a secret such as a password or a further decryption key. The table may accompany the content 12 on pre-recorded media such as a magnetic or optical data disk or a data card, or in a broadcast or other mass publication of the content directly to an memory of the device. The device is authorized to use the content 12 by virtue of having (PR-PD) and the trusted component 18, which allows access into the table.

Figure 3:
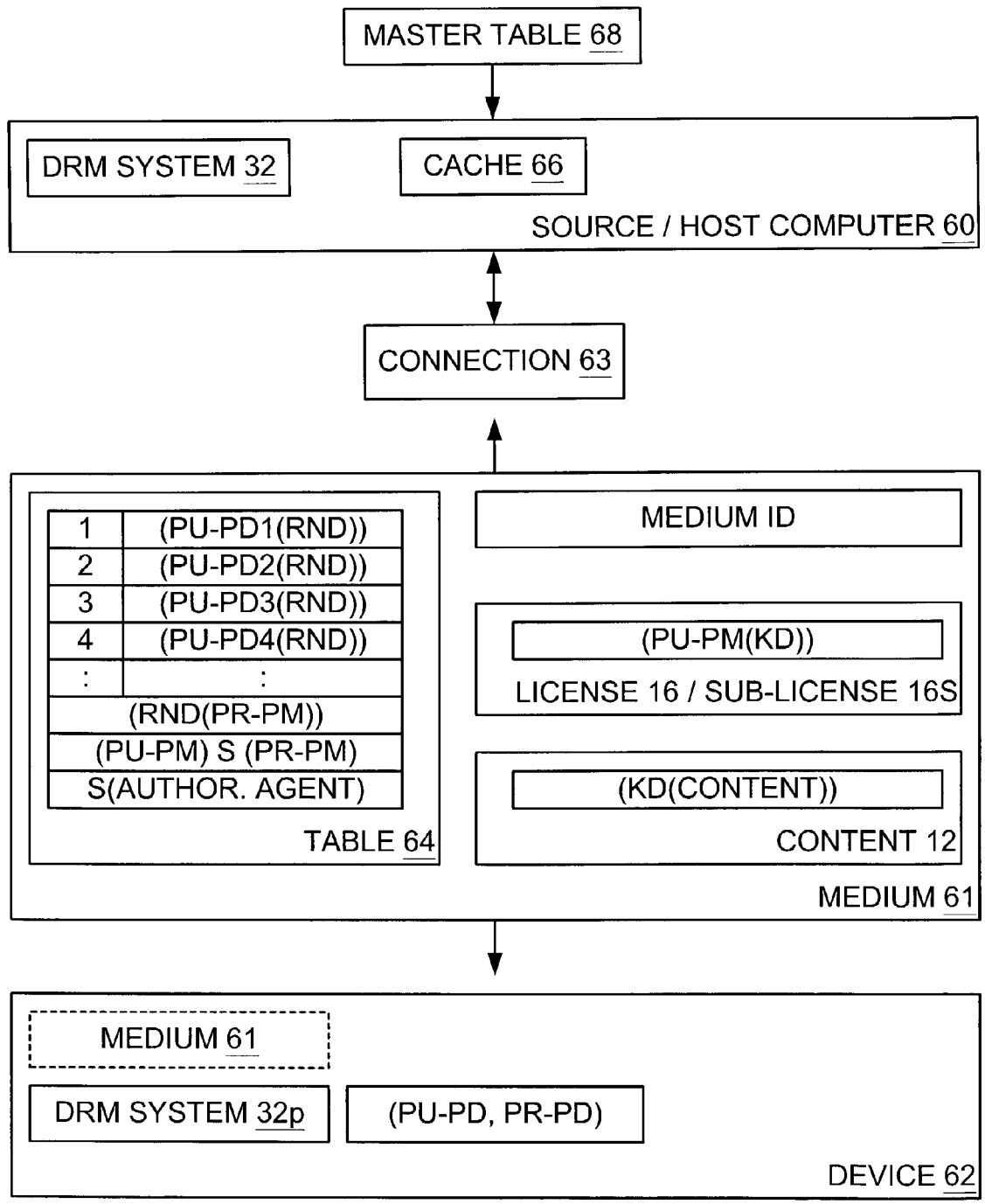
FIG. 3 is a block diagram showing a computing device, a host computer, and a storage medium having a key table and encrypted content written to by the host computer and read by the device in accordance with one embodiment of the present invention.

Referring now to FIG. 3, it is seen that in one mode of obtaining and rendering digital content 12, such digital content 12 is downloaded from a source 60 and is placed on a storage medium 61 that is either then mounted to a rendering device 62 or internal to such device 62. Although the device 62 is at a minimum a portable non-network-connective rendering device 14, such device 62 may be any appropriate device 14 without departing from the spirit and scope of the present invention.

The source 60 may be any appropriate source without departing from the spirit and scope of the present invention, bearing in mind that an appropriate connection must exist between the source 60 and the storage medium 61. Similarly, the storage medium 61 may also be any appropriate medium without departing from the spirit and scope of the present invention. For example, the source 60 may be a host computer, a remote server location, or a combination thereof, with the content 12 thereon or available therethrough. Similarly, the storage medium 61 may be portable, such as an optical disk, a magnetic disk, a media card, or the like, or may be an internal memory of the device 62. In the former case, it may for example be the case that the content 12 and associated data are downloaded from the source 60 at a kiosk, perhaps at a retail outlet. In the latter case, it may for example be the case that the device 62 is coupled to a source 60 such as for example a host computer and the content 12 and associated data are downloaded directly thereto.

In one embodiment of the present invention, when the content 12 is downloaded to the medium 61, a corresponding digital license 16 is also obtained and downloaded or otherwise placed on the medium 61. The license 16 may be a license obtained for the medium 61, or may be a sub-license 16s derived from a license 16 obtained for another computing device 14, such as for example a host computer. A method for deriving a sub-license 16s from a license 16 is set forth in U.S. patent application Ser. No. 09/892,371, filed Jun. 27, 2001, hereby incorporated by reference in its entirety. Alternatively, the obtained content 12 may include the obtained license 16 therein.

For purposes of the present invention, and again, the device 62 is presumed to be capable of performing both symmetric and asymmetric encryption and decryption, and therefore has enough memory and processing capabilities to perform such asymmetric functions in particular by way of a portable trusted component 18 (FIG. 1) instantiated in a memory thereon. In one embodiment of the present invention, and as with the subject matter disclosed in the aforementioned U.S. patent application Ser. No. 09/892,371, all obtaining of digital content 12 and corresponding digital licenses 16 or sub-licenses 16s for the medium 61 is performed by way of a host computer or the like, such as for example an at-home personal computer or a computer at a kiosk in a retail location.

In particular, the host computer obtains a license 16 for corresponding digital content 16 and then (if necessary) issues a sub-license 16s to the medium 61 for rendering the digital content 12 on the device 62. Such sub-license 16s may be issued in the course of downloading the digital content 12 from the source 60 to the medium 61, or may be issued at a time before or after downloading the digital content 12 from the source 60 to the medium 61, or at another time, all without departing from the spirit and scope of the present invention.

As may be appreciated, if a sub-license 16s is issued, such issued sub-license 16s may specify the limitations, if any, that must be satisfied to render the corresponding content 12 on the medium 61 at the device 62. Of course, such sub-license 16s may be issued only if permitted according to the terms of the corresponding license 16 as obtained from an appropriate license server 24. In issuing the sub-license 16s, at least a portion thereof is re-written to be in a form that is more amenable to the device 62. In particular, the computer 60 re-encrypts the content key (KD) for decrypting the content 12 into a form that is more amenable to decryption by the device 62. Here, and in one embodiment of the present invention, the portable medium 61 is granted a public-private key pair (PU-PM, PR-PM), and the content key (KD) is re-encrypted according to (PU-PM) to form (PU-PM(KD)) and then inserted into the license 16 or sub-license 16s.

In particular, and assuming that the content key (KD) in the license 16 on the computer 60 is encrypted according to an asymmetric key such as the public key of the host computer (PU-HC), the host computer obtains the content key (KD) by applying the private key of the host computer (PR-HC), then re-encrypts the content key (KD) according to the public key of the medium 61 (PU-PM) to form (PU-PM(KD)). Thus, and as should be appreciated, the content key (KD) as encrypted is tied to the medium 61 and not any device 62 in particular.

Procedures for creating the sub-license 16s are set forth in greater detail in the aforementioned U.S. patent application Ser. No. 09/892,371, and therefore need not be set forth herein in any detail. Any variations on such procedures that are necessary in view of the present invention should be apparent to the relevant public based on U.S. patent application Ser. No. 09/892,371.

Referring still to FIG. 3, to download the digital content 12 and the corresponding license 16 or sub-license 16s to the medium 61, such medium 61 must be coupled to the source 60 by way of a connection 63 which may be any appropriate connection without departing from the spirit and scope of the present invention. As may be appreciated, if the medium 61 is some form of portable writable storage, the connection 63 is an appropriate drive to which the medium 61 is mounted. Likewise, if the medium 61 is internal to the device 62, the connection 63 may be an appropriate cable, a wireless link such as an RF or IR link, or the like. Such connections 63 and hardware and/or software in support thereof are known or should be apparent to members of the relevant public and therefore need not be described herein in any further detail.

Bearing in mind that content 12 and a license 16/sub-license 16s (hereinafter 'license 16') therefor are on a storage medium 61, and also bearing in mind that the license 16 has the decryption key (KD) of the content 12 encrypted according to the public key of the medium 61 (PU-PM) to form (PU-PM(KD)), the private key of the medium 61 (PR-PM) should also travel with such 16 medium. However, and importantly, (PR-PM) should not be exposed, and is therefore stored in an encrypted form on the medium 61.

In particular, and in one embodiment of the present invention, (PR-PM) is encrypted by a random symmetric key (RND) to form (RND(PR-PM)), and (RND(PR-PM)) is stored in a table 64 on the medium 61. As with (PR-PM), (RND) too should not be exposed, and therefore is stored in an encrypted form on the medium. In particular, (RND) is encrypted by the public key of the device 62 (PU-PD) to form (PU-PD(RND)), and (PU-PD(RND)) is stored in the table 64 on the medium 61. Note that in an alternate embodiment, (RND) could be dispensed with, such that (PR-PM) is directly encrypted by (PU-PD). However, employing (RND) provides an additional level of indirection and isolates (PR-PM) from (PU-PD). As should now be appreciated, (RND), (PR-PM), and (PU-PM) are all stored in or associated with the table 64. Note that (PU-PM) may be stored in the table 64 on the medium 61 in the form of a certificate signed by an appropriate key. The key may be (PR-PM) (i.e., (PU-PM) S (PR-PM)), in which case (PU-PM) itself verifies the certificate. Alternatively, the key is another private key and a certificate chain in the table 64 of the medium 61 provides the corresponding public key for verification.

It is to be assumed for purposes of the present invention that the device 62 is unable to communicate its public key (PU-PD) to the medium 61 or the host computer 60, even though such capability may indeed be present without departing from the spirit and scope of the present invention. Accordingly, the entity encrypting (RND) with (PU-PD) to form (PU-PD(RND)) must already be in possession of such (PU-PD) key. Notably, there could potentially be millions of such devices 62, if not more, and each device 62 could have its own presumably unique (PU-PD) key. However, the aforementioned encrypting entity likely could not be expected to know the unique (PU-PD) key for every such device 62.

In one embodiment of the present invention, then, each device 62 has a non-unique key pair (PU-PD, PR-PD), whereby the number of (PU-PD) keys that the aforementioned entity must possess is kept at a manageable level. Nevertheless, each device 62 could have its own unique key pair without departing from the spirit and scope of the present invention. Assuming, though, that each device 62 has a non-unique key pair, distributing the non-unique key pairs to devices 62 may be done in any appropriate manner without departing from the spirit and scope of the present invention. For example, each manufacturer of a device 62 could be assigned a particular key pair, whereby all devices 62 manufactured thereby are provided with such manufacturer-specific key pair. Likewise, each model of a device 62 could be assigned a particular key pair. Similarly, each manufacturer or model of a device 62 could be assigned a number of key pairs that are either randomly or purposefully provided to specific ones of devices 62. Note that if a particular manufacturer or model becomes untrustworthy, the key pairs therefore can merely be revoked (as will be discussed below) without affecting other manufacturers or models.

A host computer 60 downloading protected content 12 and a license 16 therefor to a medium 61 doesn't necessarily know what device 62 the medium 61 is to be mounted to or is internal to. Accordingly, and as seen in FIG. 3, in one embodiment of the present invention, the host computer 60 also downloads the table 64, where such table 64 has therein (RND) encrypted according to each of several public keys of devices (PU-PD) that are known. As seen, each encrypted (RND) has a corresponding index value specifying an identifier of the (PU-PD) that encrypted the secret. For example, (PU-PD3) is specified by index value 3.

In one embodiment of the present invention, then, the table 64 includes therein (RND) encrypted according to the (PU-PDx) of the device 62 that is to be employed to render the corresponding content 12. Note that the table 64 may have (RND) encrypted according to every (PU-PDx) that is known to the host computer 60, or to a specific sub-set thereof, all without departing from the spirit and scope of the present invention. For example, a user effectuating such a download may specify that the device 62 is manufactured by a particular manufacturer, and the table 64 thus includes (RND) encrypted according to every (PU-PDx) of the manufacturer. Likewise, the user may specify that the device 62 may be any of a number of particular devices 62, and the table 64 thus includes (RND) encrypted according to every (PU-PDx) of such number of particular devices 62.

To render the content 12 on the medium 61, then, the device 62 refers to the table 64 on the medium 61 that corresponds to the content 12 and indexes to (RND) encrypted according to the (PU-PDx) of such device 62. In particular, and referring now to FIG. 4, the device 62 upon being directed to render the content 12 (step 1401) refers to the license 16 for such content 12 and determines by way of the license evaluator 20 of the trusted component 18 whether any terms of the license 16 are satisfied (step 1402).

Assuming that such terms are in fact satisfied, the device 62 obtains the table 64 corresponding thereto (step 1403), obtains the private key of such device 62 (PR-PDx) and the index value x of such device 62 (step 1405), indexes into the table 64 based on the obtained index value x (step 1407), and selects the corresponding (PU-PDx(RND)) (step 1409). The device 62 then applies the obtained (PR-PDx) to the encrypted (PU-PDx(RND)) to expose (RND) (step 1411), obtains (RND(PR-PM)) from the medium 61 (step 1413), and applies (RND) to (RND(PR-PM)) to expose (PR-PM) (step 1415). Finally, the device 62 obtains (PU-PM(KD)) from the license 16 (step 1417), and applies (PR-PM) to (PU-PM(KD)) to expose the content key (KD) (step 1419). With such (KD), then, the device 62 can render the corresponding content 12 (step 1421).

Figure 4:
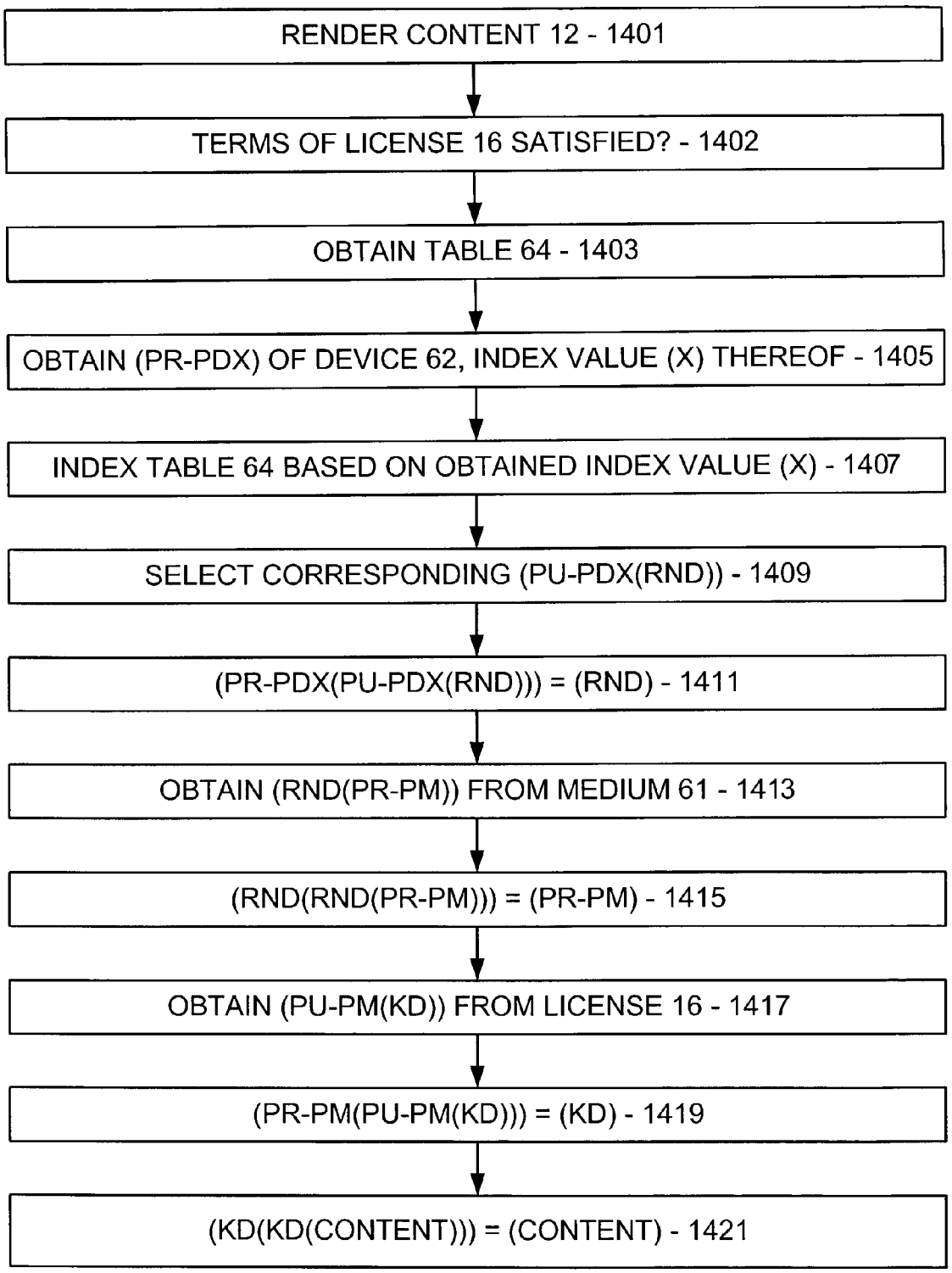
FIGS. 4 and 5 are flow diagrams showing key steps performed by the device of FIG. 3 in rendering the content.

Bearing in mind that each content key (KD) for content 12 on the medium 61 is protected by the same public key of the portable medium 61 (PU-PM), and bearing in mind that the table 64 as described includes (RND(PR-PM)) and a (PU-PDx(RND)) for each of several devices 62, it should be appreciated that only one table 64 is necessary per medium 61. In one embodiment of the present invention, then, the table 64 on the medium 61 is a common table 64 that corresponds to a plurality of pieces of content 12 on the medium 61, where each of the plurality of pieces of content 12 is protected by the common table 64. Accordingly, to render any of the plurality of pieces of content 12 on the medium 61, a device 62 need only refer to the common table 64 to obtain (PR-PM) therefrom. Thus, substantially the same method as shown in FIG. 4 may be employed.

As set forth above, the table 64 produced by the host computer 60 may have (RND) encrypted according to every (PU-PDx) that is known to the host computer 60, or to a specific sub-set thereof. In the latter case, exclusion of a (PU-PDx) from the sub-set in the table 64 bars a corresponding device 62 from rendering the corresponding content 12. In the former case, a corresponding device 62 is similarly barred from rendering the content 12 by leaving blank the field in the table 64 for the corresponding (PU-PDx(RND)). Alternatively, such field maybe filled with any alternate data such as zeroes, gibberish or nonsense data.

In one embodiment of the present invention, each device 62 is provided with more than merely a single key pair (PU-PDx, PR-PDx). Accordingly, if a device can have x key pairs and the table 64 has n entries, such table can support $n^x$ different classes of device, model, manufacturer, etc., each having a unique combination of the n key pairs. Of course, each compromise will invalidate x pairs and hence, the table 64 becomes invalid after about n/x device compromises.

With each device 62 being provided with more than merely a single key pair (PU-PDx, PR-PDx), the device 62 attempts to employ each available (PR-PDx) on the table 64 until one is found to expose the secret needed to render the content 12. In such embodiment, if it is found to be necessary to invalidate the device 62 (as being non-trustworthy, e.g.), the host computer 60 must leave out from the table 64 the entries that would correspond to all of the (PU-PDx)s of the device 62. In such a situation, an invalidated device 62 with (PU-PDx)s A, B, C, and D would result in the 'cancellation' of such device keys A, B, C, and D from the table 64. Note that in such situation, a device 62 with (PU-PDx)s B, C, D, and E would still be able to access from the table 64 the secret as indexed under device key E, assuming device key E was not canceled too, but not the (PU-PDx)s as indexed under device keys B, C, or D.

In one embodiment of the present invention, the host computer 60 in creating the table 64 to be downloaded to the medium 61 ties such table 64 to the medium 61. Thus, the table 64 cannot be freely transported to other media 61. In one embodiment of the present invention, the table 64 is tied to the medium 61 by having the ID of the medium 61 securely built in. The ID may be securely built into the table 64 by being employed as at least one basis for a signature attached to the table. Alternately, the ID may be encrypted or signed by (RND), (PR-PM), or (PU-PM).

Figure 5:
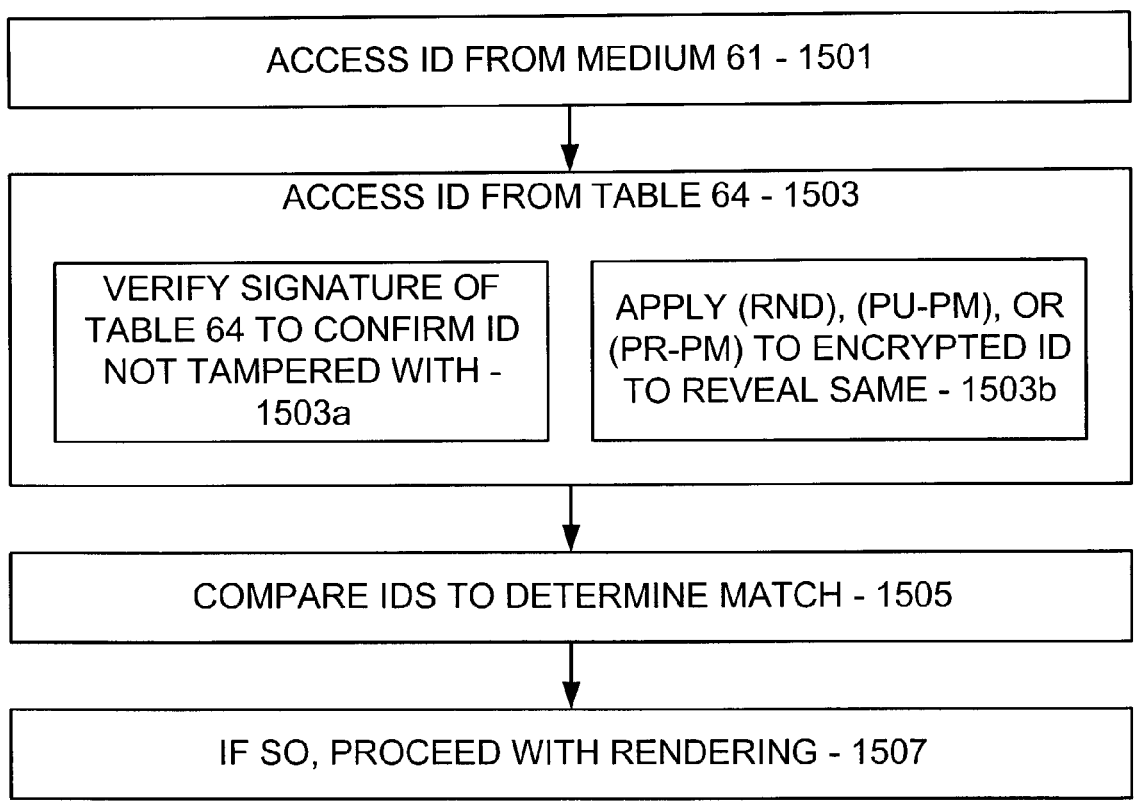

As should be appreciated, the ID of the medium 61 is collected by the host computer 60 prior to constructing the table 64 for such medium 61, and the table 64 is in fact constructed/prepared by the host computer 60 to be tied to the medium 61. To verify the table 64 is associated with the medium 61, then, and referring now to FIG. 5, the device 62 accesses the ID from the medium 61 (step 1501), accesses the ID from the table 64 (step 1503), and compares the two IDs to determine whether they match (step 1505). If so, the rendering is allowed to proceed (step 1507). Note that accessing the ID from the table 64 at step 1503 may involve verifying the signature of the table 64 to confirm that the accessed ID has not been tampered with (step 1503*a*), or applying (RND), (PR-PM), or (PU-PM) to the encrypted ID to reveal same (step 1503*b*).

As set forth above, a first signature of the table 64 based on the ID of the medium 61 may be employed to verify the ID associated with the table 64. Similarly, the entire table or a portion thereof may be the basis of a second signature provided by an authorizing agent. The second signature is not needed by the device 64 to render the content 12, but may be employed as a security precaution for devices or applications adding new content 12 to a medium 61 with an existing table 64. In particular, the second signature verifies that the existing table 64 was created by the authorizing agent, rather than by a nefarious entity. The second signature also helps validate the version number (see below) of the table 64 and thus the 'freshness' of the table 64.

It is to be recognized that details within the table 64 on the medium 61 may need to be updated or modified from time to time. For example, a device 62 may become invalidated and the table entries for (PU-PDx) therefor may need to be removed, and/or new entries may need to be added, and/or the keys associated with the table 64 ((RND), (PR-PM), (PU-PM)) may need to be changed. Difficulties especially arise when the medium 61 can be updated, but old content 12 and capabilities must simultaneously be retained. Such is the case when a host computer 60 writes new (protected) content 12 to the medium 61 and old (protected) content is already present thereon, particularly if the table 64 is relatively old. In this case, and in one embodiment of the present invention, the old table 64 on the medium 61 which has an old secret is replaced with a new, updated table 64 which has a new secret. The new table 64 with the new secret of course supports the new content 12 on the medium 61 protected by such new secret. Significantly, the new table 64 should also support the old content 12 on the medium 61 protected by the old secret. All devices 62, including invalidated devices 62, must retain access to old content 12.

Figure 6:
FIG. 6 is a block diagram showing an (N+1)th table as derived from an (N)th table by the host computer of FIG. 3.

This is accomplished by a table 64 such as that shown in FIG. 6, where the table 64 itself and each entry in the table 64 are given a non-decreasing version value relative to a master table 68 maintained by an administrator. The administrator may be any appropriate entity without departing from the spirit and scope of the present invention, and principally is responsible for maintaining within the master table 68 each and every (PU-PDx) that will possibly go into any table 64.

In addition to each (PU-PDx), the administrator may also maintain information in the master table 68 such as for example an index value and a valid flag for each (PU-PDx). As may be appreciated, the administrator decides when a (PU-PDx) is no longer trustworthy and therefore to be invalidated, or receives such decision from another entity, and accordingly marks the valid flag for such (PU-PDx). Of course, the master table 68 may have other information without departing from the spirit and scope of the present invention. Significantly, the master table 68 also includes a version value, and each time the administrator changes the master table 68, the version value thereof is incremented. Such version value may be a version number, date, or other increasing value.

Each time a table(N) 64 on a medium 61 with secret(N) is replaced by a new table(N+1) 64 with a new set of keys ((PU-PM, (PR-PM), (RND)), new content 12 placed on the medium 61 thereafter is linked to the new key-set(N+1). Simultaneously, within any new table 64, each key-set(N) encrypts and protects the previous key-set(N−1) such that all key-sets ever associated with the medium 61 and the content 12 thereon are accessible from a 'daisy chain' of the key-sets in the table 64. In particular, and as may be appreciated from the above, in the daisy chain, each (RND) encrypts and protects the previous (RND) and is included, and every previous (RND(PR-PM)) is also included. Notably, and as should also be appreciated from the above, no form of (PU-PM) need be archived in the daisy chain as old (PU-PM)s are never used to encrypt content keys (KD) and therefore are not needed anymore.

By daisy-chaining the key-sets, a device 62 that can access a particular key-set within the daisy chain can by extension access all earlier key-sets in the daisy chain, but not any of the later key-sets. Of course, a device 62 should be able to access the latest key-set of the medium 61 unless such device 62 was invalidated.

Based on the above, methods for facilitating, effectuating, and supporting the content 12 and the table 64 on the medium 61 are set forth below.

Figure 7:
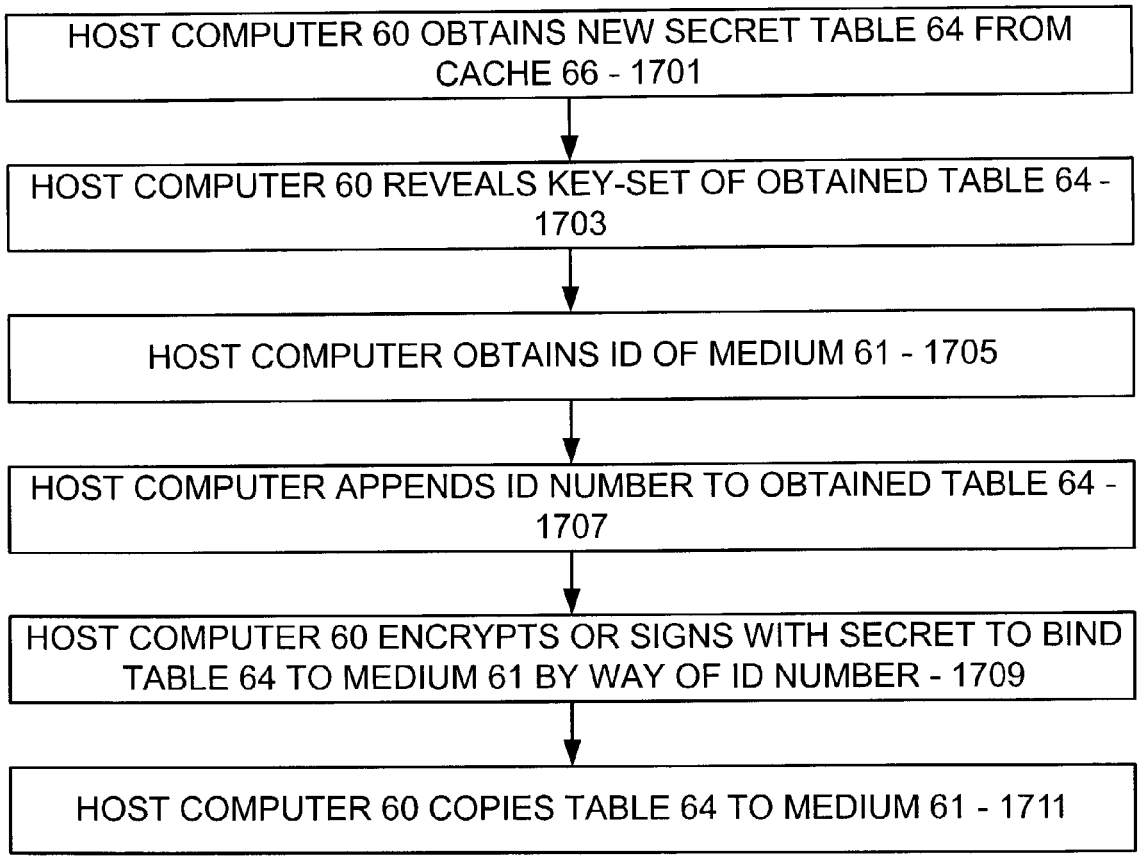
FIG. 7 is a flow diagram showing key steps performed by the host computer of FIG. 13 in obtaining a new table for the medium.

Referring now to FIG. 7, to write a new table 64 to a medium 61 without any table 64 thereon, the host computer 60 first obtains such table 64 from a cache 66 (FIG. 3) (step 1701). The cache 66 contains at least one table 64, where each table 64 is based on a different key-set, as obtained from the master table 68 and the administrator thereof by way of a table server or the like (not shown). Production of the tables 64 by or for the table server to be distributed to the cache 66 may be done by any appropriate method without departing from the spirit and scope of the present invention.

For example, to produce a table 64, the table server or another device may have access to the master list and a key generator, and may employ the key generator to produce (RND), (PU-PM), and (PR-PM) for the key-set for the table 64. For each valid (PU-PDx) in the master list, then, such (PU-PDx) is employed to encrypt the generated (RND), and such (PU-PDx(RND)) is appropriately placed in the table 64 being produced. Note, though, that for each invalid (PU-PDx) in the master table 68, (RND) is not encrypted thereby and placed in the table 64 being produced. Instead, the space for such (PU-PDx(RND)) is merely left blank or is filled with some pre-determined value such as zeroes. In addition, the version number of the master list is adopted as the version number of the table 64 being produced and placed therein in an appropriate location, (RND(PR-PM)) and ((PU-PM) S (PR-PM)) are calculated and placed in the table 64 in an appropriate location, and the table 64 including the version number thereof is signed by a private key of the administrator or another appropriate entity (i.e., the authorizing agent above).

As should now be appreciated, one or more tables 64 are placed in the cache 66 at appropriate times, based on demand or the like. It may alternately be the case that a new table 64 is obtained on demand directly from the table server operating as the cache 66. Note that the host computer 64 may use a table 64 from the cache 66 once or more than once without departing from the spirit and scope of the present invention.

As with the device 62, the host computer 60 has a (PU-PDx) that indexes into any table 64. Accordingly, the host computer 60 employs the (PU-PDx and the index value thereof to find the corresponding entry in the obtained table 64 and reveal (RND) and (PR-PM) for such table 64 (step 1703). Note that the host computer 60 may have several (PU-PDx)s. If it is the case that none of the key entries in the obtained table 64 match the latest table version, the (PU-PDx)s of the host computer are obsolete or revoked and must be updated before any content 12 may be written to the medium 61.

With (RND) and (PR-PM) for the obtained table 64 revealed and (PU-PM) for the obtained table 64 available, the host computer 60 obtains the ID number of the medium 61 therefrom (step 1705) and appends such ID number to the obtained table 64 (step 1707). The host computer 60 then encrypts or signs with either (RND), (PU-PM), or (PR-PM) to bind the table 64 to the medium 61 by way of the ID number thereof (step 1709), assuming the ID number is in fact employed. Thereafter, the host computer 60 copies the table 64 to the medium 61 (step 1711).

Figure 8:
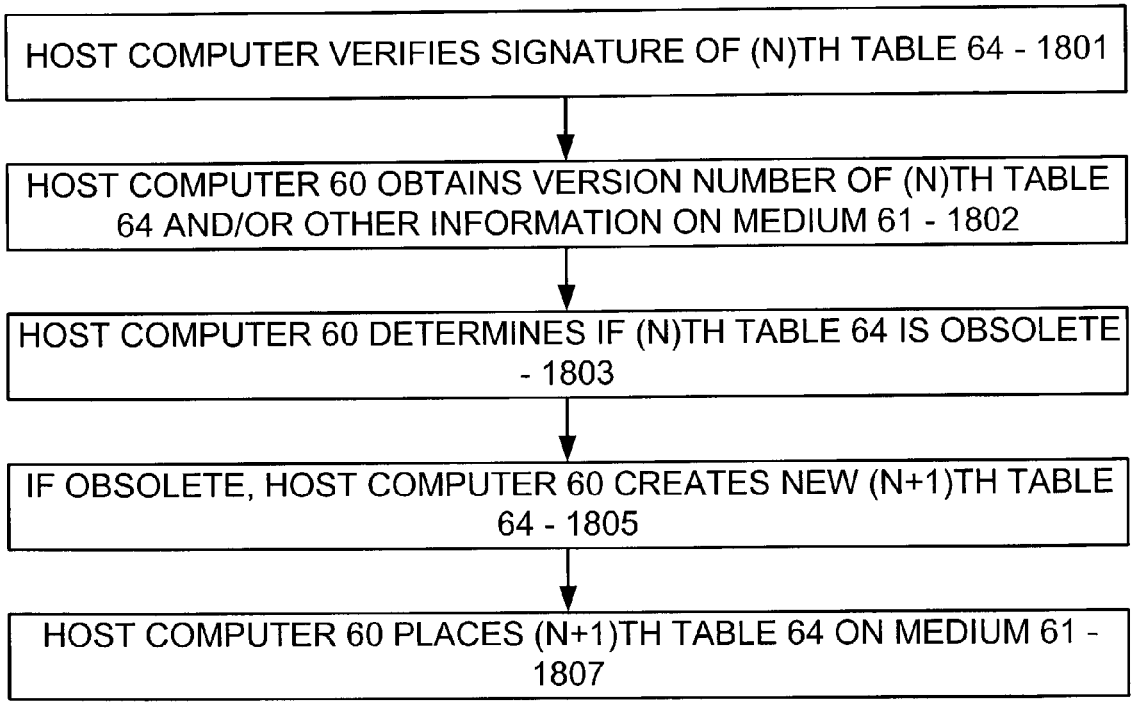
FIGS. 8 and 8A are flow diagrams showing key steps performed by the host computer of FIG. 3 in replacing a table on the medium.

Assuming now that the medium 61 already has a table 64 thereon and is to receive new content 12, and referring now to FIG. 8, the host computer preliminarily checks the table 64 on the medium 61 to see if the signatures therein verify (step 1801). If not, the medium 61 is likely bad and should be reformatted. In addition, the host computer 60 obtains the version number of the table 64 and/or other information on the medium 61 (step 1802) and determines based thereon if such table 64 is obsolete (step 1803). For example, the host computer 60 may determine based on the obtained version number and/or other information that the table 64 is relatively old, or that the table 64 does not reflect certain invalidated devices 62. In addition or in the alternative, a term in a license 16 corresponding to the new content 12 may require that the table 64 be updated to a newer version number. For example, if the version number of the table 64 on the medium 61 is 40 and such a term requires such version number to be at least 60, the table 64 must be updated.

Figure 8A:
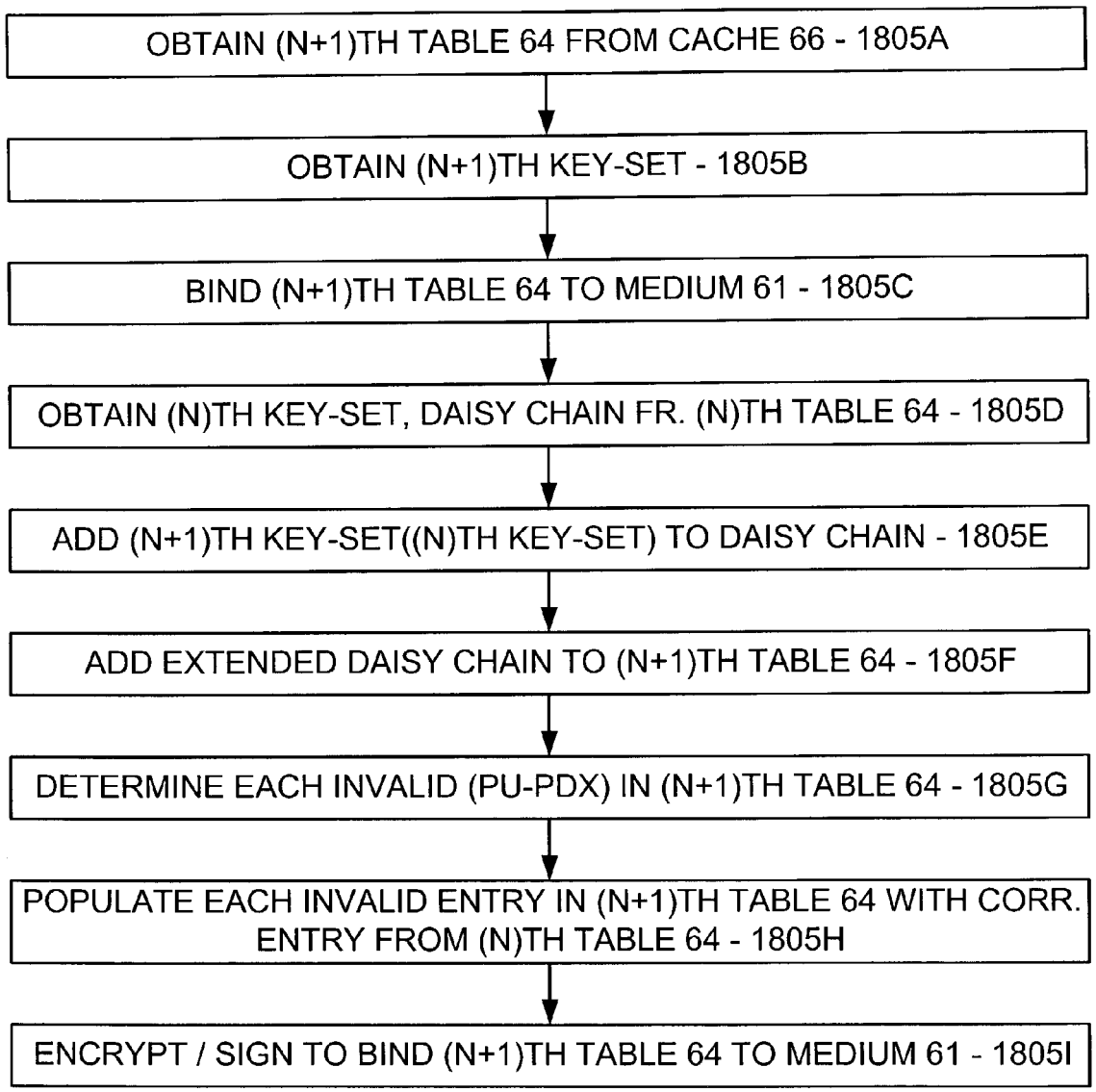

If the table 64 on the medium 61 must in fact be updated, the host computer 60 creates or obtains a new (N+1)th table 64 to replace the (N)th table 64 already on the medium 61 (step 1805) and places same thereon (step 1807). In particular, and referring now to FIG. 8A, the host computer obtains the (N+1)th table 64 with an (N+1)th key-set from the cache 66 (step 1805a), obtains the (N+1)th key-set as in FIG. 7 (step 1805b), and binds the (N+1)th table 64 to the medium 61 as in FIG. 7 (step 1805c). Note that the (N+1)th table 64 as obtained from the table server by way of the cache 66 already has a more up-to-date version number in an appropriate location. Also, the host computer 60 obtains the (N)th key-set from the (N)th table 64 on the medium 61 and if present a daisy chain of previous key-sets in the (N)th table 64 (step 1805d). The host computer then extends the obtained daisy chain by one to add the (N)th key-set thereto encrypted according to the (N+1)th key-set as the next link in the daisy chain of key-sets (step 1805e), and adds the extended daisy chain to the (N+1)th table 64 (step 1805f).

The host computer 60 also adjusts the (N+1)th table to include old secrets for (PU-PDx)s that have been invalidated, and assigns a version number to each entry. In particular, the host computer 60 determines from the (N+1)th table 64 which (PU-PDx)s are invalidated (step 1805g), and populates the entry in such (N+1)th table 64 for each invalidated (PU-PDx) with the corresponding entry in the (N)th table 64, along with the version number of such corresponding entry (step 1805h). Note that the host computer 60 may for example determine from the (N+1)th table 64 which (PU-PDx)s are invalidated by determining which entries in such (N+1)th table are empty or are filled with some pre-determined value such as zeroes.

The host computer 60 may then assign the version number of the (N+1)th table 64 to all (PU-PDx) entries therein not changed and therefore still valid. Alternatively, the table server that created the (N+1)th table 64 already performed such assignment. Thus a valid device 62 with a valid key pair (PU-PDx, PR-PDX) can access the latest ((N+1)th) key-set of the (N+1)th table 64. Correspondingly, an invalidated device 62 with an invalidated device key (DK) can access a corresponding key-set in the (N+1)th table 64, but the accessed key-set is that of a previous table 64 for the medium 61, not from such (N+1)th table 64. As set forth above, with such accessed key-set, the device 62 can by extension access all earlier key-sets in the daisy chain, but not any of the later key-sets.

Once the entries in the (N+1)th table are properly adjusted, the host computer 60 then encrypts or signs the (N+1)th table 64 to bind the (N+1)th table 64 to the medium 61 by way of the ID number thereof as in FIG. 7 (step 1805i). Finally, the (N+1)th table 64 is copied to the medium 61 as at step 1807 to replace the (N)th table 64 thereon.

Assuming now that a medium 61 has thereon a current table 64 with a current key-set, a version number relative to the master table 68, and an ID number employed to bind the table 64 to the medium 61, the host computer 60 may write content 12 to the medium 61. To do so, and referring now to FIG. 9, the host computer 60 obtains the ID number from the medium 61 (step 1901), obtains the key-set from the table 64 on the medium 61 (step 1903), confirms the signatures of the table 64 (step 1905), and confirms that the ID number in the table 64 matches the ID number of the medium 61 (step 1907). Assuming the confirmations are positive, the host computer 60 then encrypts the content 12 to be written to the medium 61 according to a content key (KD) to form (KD(content)) (step 1909), and generates a license 16 for the content 12 including (PU-PM(KD)) (step 1911), thereby binding the content 12 to the medium 61 by way of the license 16, and copies the encrypted content 12 and the license 16 to the medium 61 (step 1913). Thereafter, the host computer 60 may take any appropriate post-copying action as necessary and appropriate. For example, if the content 12 is supplied as part of a financial transaction, the host computer may mark the transaction complete, charge an account, increment or decrement a count value, etc.

Figure 9:
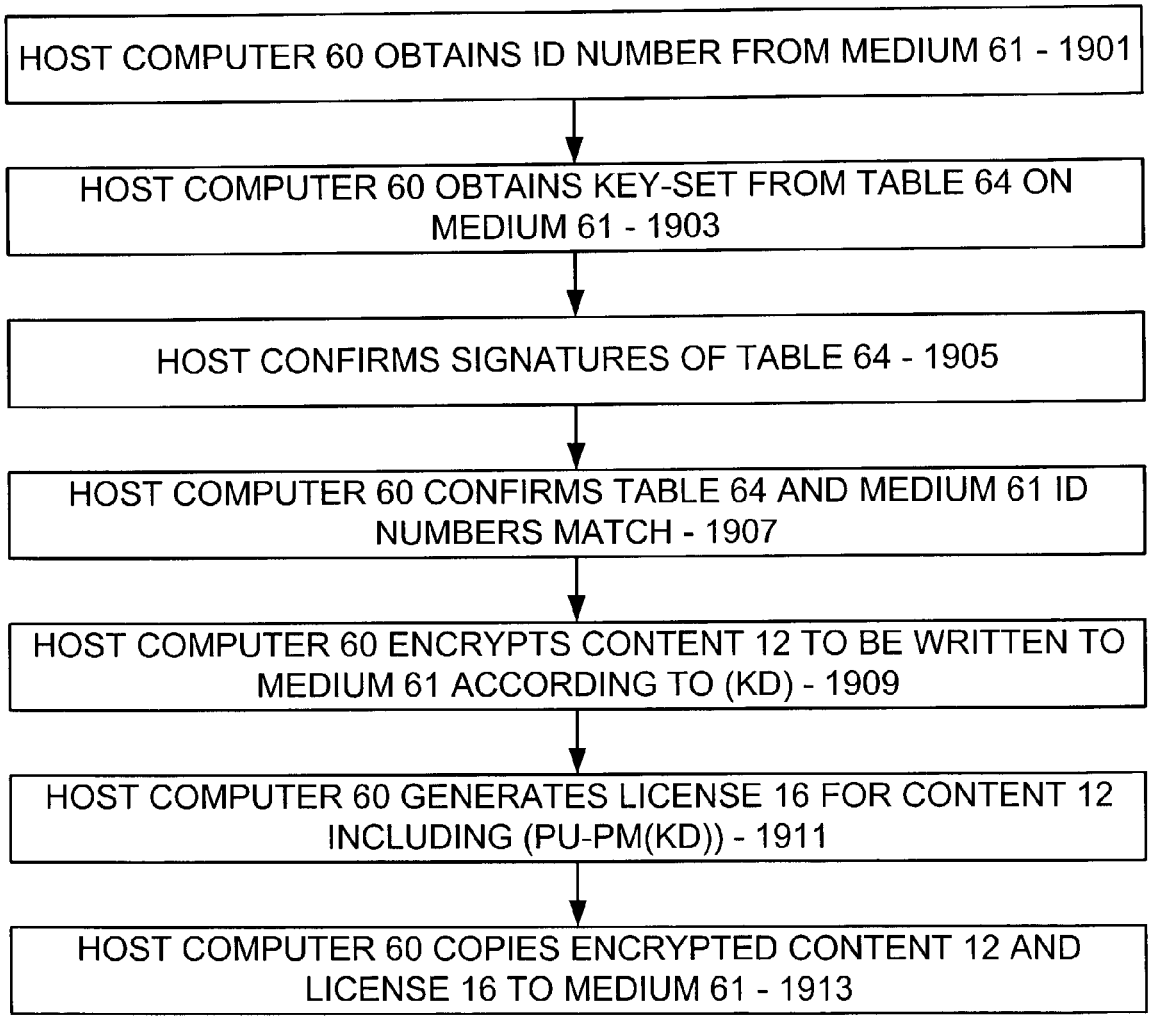
FIG. 9 is a flow diagram showing key steps performed by the host computer of FIG. 3 in writing content on the medium.

Note that the steps performed in connection with FIG. 9 take place without any of any particular device 62. In particular, the steps do not take into consideration whether the device 62 to which the medium 61 is to be mounted or is internal to is valid and thus has valid device key(s) (DK). In fact, the host computer 60 likely has no way of verifying such issue prior to writing the content 12 to the medium 61. If in fact an invalidated device 62 attempts to render the content 12 on the medium 61, where the content 12 is encrypted according to a secret later than any secret accessible by the invalidated device 62 from the table 64 on the medium 61, the attempt will fail.

Once content 12 has been copied to the medium 61, such content 12 may be rendered by any device 62 that has compatible software and that can read the medium 61 and that can accept same (if the medium 61 is separate therefrom). Of course, the device 62 must have an appropriate trusted component 18s and a private key (PR-PDx) that indexes into the table 64 on the medium 61. In addition, the device 62 cannot have been revoked or invalidated from the table 64 and not be able to access from the table 64 the secret necessary to render the content 12.

Figure 10:
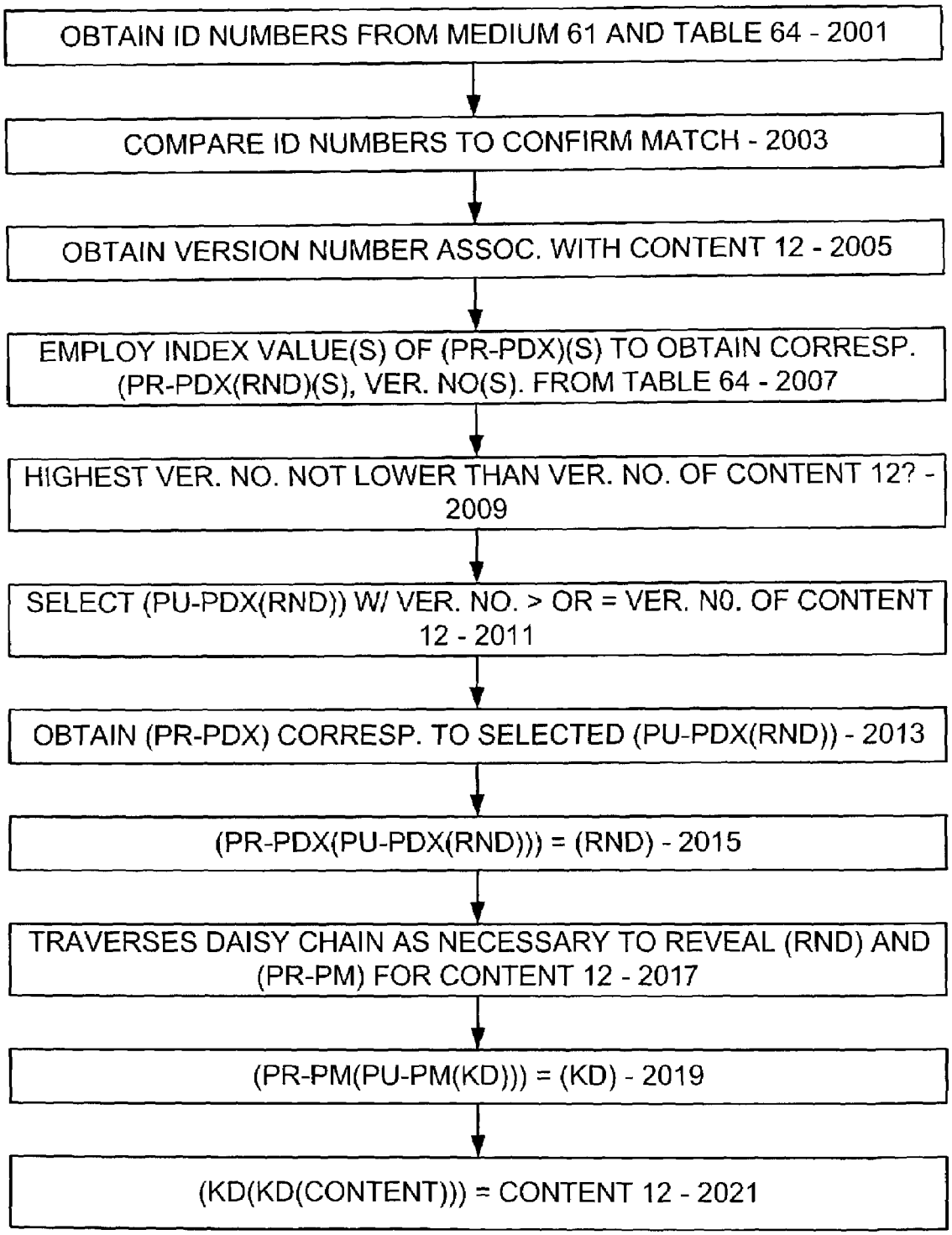
FIG. 10 is a flow diagram showing more key steps performed by the device of FIG. 3 in rendering the content.

To render the content 12 on the medium 61 by the device 62, and referring now to FIG. 10, such device 62 obtains the ID number from the medium 61 and from the table 64 on the medium 61 (step 2001), and compares same to the ID number in the table 64 thereon to confirm that the table 64 belongs on the medium 61 (step 2003). Assuming the compare succeeds, the device 62 then obtains a version number associated with the content 12 to be rendered (step 2005). Note that the version number of the content 12 may be located at any appropriate location without departing from the spirit and scope of the present invention, and corresponds to the version number of the table 64 the key-set thereof having been employed to protect the content 12. For example, the version number may be placed in the or attached to the content 12 by the host computer 60 prior to downloading same to the medium 61, or may be placed by such host computer in a license 16 or sub-license 16s that accompanies the content 12.

The device 62 then employs the index value(s) of the (PR-PDx)(s) thereof to obtain the corresponding (PU-PDx (RND))(s) and the version number(s) thereof from the table 64 (step 2007). As may be appreciated, the device 62 then determines whether the highest version number of the obtained (PU-PDx(RND))(s) is lower than the version number of the content 12. If so, the content 12 cannot be rendered by the device (step 2009). If not, one of the obtained (PU-PDx(RND))(s) having a version number greater than or equal to the version number of the content 12 is selected (step 2011). The selected (PU-PDx(RND)) should have the version number of the content 12 so that no traversal of the daisy chain is necessary, or should be closest to such version number of the content 12 so that traversal of the daisy chain is as brief as possible.

The device 62 then obtains the (PR-PDx) thereof corresponding to the selected (PU-PDx(RND)) (step 2013) and applies same to reveal (RND) (step 2015). If necessary, (RND) is then employed to traverse the (RND)s in the daisy chain of the table 64 back to the (RND) employed to protect the content 12, and such (RND) is then applied to the corresponding (RND(PR-PM)) to reveal the (PR-PM) thereof (step 2017). As should be appreciated, the version number of the selected (PU-PDx(RND)) is employed to determine where to enter the daisy chain, and the device 62 traverses back in the daisy chain to the appropriate version number that reveals (PR-PM) for the content 12.

Once (PR-PM) for the content 12 is revealed, such (PR-PM) is applied to (PU-PM(KD)) from the license 16 for the content 12 to reveal (KD) (step 2019), and (KD) is then applied to (KD(content)) from the content 12 to reveal such content 12 (step 2021), presuming the license 16 for the content 12 is satisfied.

Note that in the course of providing an (N+1)th table 64 to a medium in place of an (N)th table 64 already thereon, it may be the case that the version number of the (N+1)th table 64 is not the next version number of the (N)th table 64. Instead, and as seen in FIG. 6, it may be the case that the (N)th table 64 was created from version number 19 of the master table 68 and therefore has a version number of 19, and the (N+1)th table 64 was created from version number 25 of the master table 68 and therefore has a version number of 25. Since all content 12 downloaded to the medium 61 is protected according to the key-set of the current table 64, and the table 64 on the medium 61 changed from version number 19 with key-set19 to version number 25 with key-set25, it is not likely possible that content 12 downloaded after table 64 changed to version number 19 could be protected by any secret other than SECRET19 or SECRET25.

As was set forth above, the table 64 as produced by the table server or the like is signed by a private key of the administrator or another appropriate entity. However, at step 1805h of FIG. 8, the host computer 60 populates the entry in such (N+1)th table 64 for each invalidated (DK) with the corresponding entry in the (N)th table 64, along with the version number of such corresponding entry. Thus, when the host computer 60 confirms such table server signature as at step 1905 of FIG. 9, such confirmation will fail unless the host computer 60 first fixes up each populated entry to reflect the state thereof at the time of the table server signature. Such fixing up should be apparent to the relevant public and therefore need not be described herein in any detail.

As described in connection with the drawings, the version number runs with the master table 68. However, it may instead be the case that the version number runs with the medium 61, for example, without departing from the spirit and scope of the present invention. Note that if the version number runs with the medium 61, the host computer 60 would among other things be responsible for determining the version number of an (N)th table 64 and incrementing same in the course of creating an (N+1)th table 64 for a medium 61.

As the version number of the master table 68 increases, there will be fewer and fewer valid device key entries in any table 64. Thus, it may be desirable to extend the master table 68 and tables 64 to add new entries. Assume for example that a master table 68 has 10 entries, 1–10. Over time, the device keys (PU-PDx, PR-PDx) that are the bases of the entries become compromised and are invalidated in the master table 68. At the point where a single valid entry (3, for example) is left in the master table 68, it is decided to extend such master table 68 by adding entries 11–20. Thus, all new tables 64 are based on the extended master table 68 where, entries 1, 2, and 4–10 are invalid, and entries 3 and 11–20 are valid. Device keys corresponding to entries 3 and 11–20 may then be distributed to the next generation of devices 62 for reading new content 12.

Crucially, the last device keys to be invalidated (9, for example) is also be distributed to the next generation of devices 62. That is, every new device 62 should include the device keys corresponding to entry 9. Although such device keys for entry 9 have already been compromised, further distribution will not weaken that penetration. But since all "first generation" content 12 considered such device keys for entry 9 to be valid, such device keys can be employed by such first generation content 12 to provide access thereto.

In this manner, the last invalidated device key entry has special value. Since it has been compromised, it may be widely distributed. But since it hasn't been revoked until the issuance of the "second generation" extended table 64, it provides access to all first generation content 12. Thus, the last invalidated set of device keys serves to bridge the two generations and serves as the crucial element for extending the new table 64. Note that in the present example, the device keys for entry 3 could also serve as a bridge since they provide access to all old content 12, but there may be reluctance to distribute it too widely, since it has not been compromised yet.

CONCLUSION

Although the present invention is especially useful in connection with a device 62 with limited connectivity such as was set forth above, the present invention may be practiced with regard to any appropriate device, all without departing from the spirit and scope of the present invention, such as for example a personal computer, a server, an intelligent appliance, etc. More concretely, the present invention for example could be used to enable a CD player to play a CD with protected music, to allow a set-top box to have access to a premium television broadcast, etc. Accordingly, the device 62 is to be interpreted to encompass any device that has a set of device keys (PU-PD, PR-PD) and that can receive content 12 and an accompanying table 64 and obtain the keys to render the received content 12 from the table based on (PR-PD), or the like.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism that allows the digital rights management architecture 10 to be extended to a non connective device 62. Such architecture 10 in particular allows for encryption and data-protection for content 12 on device 62, even though the device 62 upon which the content 12 is to be rendered may not have the capabilities to communicate with a remote entity over a network connection or the like. It should be appreciated that changes could be made to the embodiments described above without departing from the inventive concepts thereof.

For one example, and as was set forth above, in an alternate embodiment, (RND) could be dispensed with, such that (PR-PM) is directly encrypted by each (PU-PDx) in the table 64. In such a situation, decryption of (PU-PDx(PR-PM)) would lead directly to (PR-PM), and the various methods described above should be altered accordingly. Similarly, (PU-PM(KD)) could be stored with the content 12 and the corresponding license 16 could be dispensed with or could be incorporated into the content 12. Again, the various methods described above should be altered accordingly. In either scenario, such alterations should be apparent to the relevant public based on the present disclosure. For another example, indexing into a key table 64 may be performed without the aid of index values. Instead, other indexing aids may be employed, as is known.

It should be understood, therefore, that this invention is not limited to the particular embodiments disclosed, but it is intended to cover modifications within the spirit and scope of the present invention as defined by the appended claims.

The invention claimed is:

1. A method performed in combination with a device having a public-private key pair (PU-PD, PR-PD), the device for receiving a storage medium or having the storage medium, the storage medium having a public-private key pair (PU-PM, PR-PM) and having stored thereon digital content encrypted by a content key (KD) (KD(content)), a digital license corresponding to the content including (KD) encrypted by (PU-PM) (PU-PM(KD)), and a table including a plurality of entries therein, each entry including a random key (RND) encrypted by a (PU-PD) of one of a plurality of devices (PU-PDx(RND)), the table further including (PR-PM) encrypted by (RND)(RND(PR-PM)), the method for the device to render the content on the medium and comprising: receiving a request to render the content on the medium; obtaining the table from the medium; obtaining (PR-PD); Indexing into an entry of the table based on the obtained (PR-PD); obtaining (PU-PD(RND)) from the indexed-into entry of the table; applying (PR-PD) to (PU-PD(RND)) to expose (RND); obtaining (RND(PR-PM)) from the table; applying (RND) to (RND(PR-PM)) to expose (PR-PM); obtaining (PU-PM(KD)) from the license; applying (PR-PM) to (PU-PM(KD)) to expose (KD); obtaining (KD(content)) from the storage medium; applying (KD) to (KD(content)) to expose the content; and rendering the exposed corresponding content, wherein the device has a public-private key pair (PU-PDx, PR-PDx) with a pre-selected index value x, and wherein each entry in the table includes a random key (RND) encrypted by a (PU-PDx) of one of a plurality of devices (PU-PDx(RND)) and an index value x thereof, the method comprising: obtaining (PR-PDx) and the index value x; indexing into an entry of the table based on the obtained index value x; obtaining (PU-PDx(RND)) from the indexed-into entry of the table; applying (PR-PDx) to (PU-PDx(RND)) to expose (RND); and obtaining (RND(PR-PM)) from the table, wherein the table on the medium is updated periodically to have a new key-set including (RND), (PU-PM), and (PR-PM) and has a daisy chain of prior key-sets, each prior (RNDn) in the daisy chain being encrypted according to an immediately following (RNDn) to form a series of links, each link in the daisy chain also having a corresponding (RNDn(PR-PMn)), and where each entry of the table includes the new (RNDn) or one of the prior (RNDn)s encrypted according to a (PU-PDx) of one of a plurality of devices, an index value x, and a version number n for the encrypted (RNDn) of the entry, and wherein the content to be rendered has a version number m corresponding to the secret in the daisy chain protecting such content, the method comprising: determining the version number m of the content; selecting the encrypted secret from the indexed-into entry; obtaining (PU-PDx(RNDn)) and the corresponding version number n of such (RNDn) from the indexed-into entry of the table; applying (PR-PDx) to (PU-PDx(RNDn)) to expose (RNDn); determining based on the version number n of (RNDn) an entry point into the daisy chain; traversing back from the entry point of the daisy chain to expose the (RNDm) corresponding to the version number m of the content; and applying the exposed (RNDm) to the corresponding (RNDm(PR-PMm)) to expose (PR-PMm); applying the exposed (PR-PMm) to expose (KD), wherein a device may traverse the daisy chain from the entry point to obtain earlier secrets but not later secrets.

2. The method of claim 1 wherein the device has a plurality of public-private key pairs (PU-PDx, PR-PDx), each with a pre-selected index value x, the method comprising:

obtaining each (PR-PDx) and the index value x thereof;
for each (PR-PDx):
indexing into an entry of the table based on the corresponding obtained index value x;
obtaining (PU-PDx(RND)) from the indexed-into entry of the table; and
applying (PR-PDx) to (PU-PDx(RND)) to expose (RND); until (RND) is in fact exposed.

3. The method of claim 1 wherein the medium includes an ID thereof thereon and the table includes the ID of the medium stored therein, wherein the table is tied to the medium by the ID, the method further comprising:

obtaining the ID of the medium therefrom;

obtaining the ID of the medium as stored in the table;
comparing the obtained IDs and proceeding only if the IDs match.

4. The method of claim 3 wherein the table includes a signature based at least in part on the ID of the medium as stored therein, the method further comprising verifying the signature to verify the ID.

5. The method of claim 3 wherein the table includes the ID of the medium encrypted according to the secret as exposed, the method comprising obtaining the ID by applying the secret to the encrypted ID to reveal same.

6. The method of claim 1 further comprising:
determining based on the version number n of (RNDn) and the version number m of the content whether the secret can be employed to render the content, and
proceeding only if the version number n of (RNDn) is not lower than the version number m of the content and therefore can be employed to render the content.

7. A method performed in combination with a host computer and a plurality of devices each having a public-private key pair (PU-PD, PR-PD), each device for receiving a storage medium or having the storage medium, the storage medium including an ID thereof thereon and having a public-private key pair (PU-PM, PR-PM) and for having stored thereon digital content encrypted by a content key (KD) (KD(content)), a digital license corresponding to the content including (KD) encrypted by (PU-PM) (PU-PM (KD)), and a table including a plurality of entries therein, each entry including a random key (RND) encrypted by a (PU-PD) of one of a plurality of devices (PU-PD(RND)), the table further including (PR-PM) encrypted by (RND)(RND (PR-PM)), the method for the host computer to provide the medium with the table and comprising:
obtaining the table from a cache;
obtaining the ID of the medium therefrom;
appending the obtained ID of the medium to the obtained table;
employing a (PR-PD) to find the corresponding entry in the obtained table and expose (RND);
tying the table to the medium by the ID of the medium and (RND); and
copying the tied table to the medium,
wherein each device has a public-private key pair (PU-PDx, PR-PDx) with a pre-selected index value x, and wherein each entry in the table includes a random key (RND) encrypted by a (PU-PDx) of one of a plurality of devices (PU-PDx(RND)) and an index value x thereof, the method comprising employing a (PR-PDx) and the index value x thereof to find the corresponding entry in the obtained table and expose (RND),
wherein the provided table is an (N)th table, the method further comprising the host computer providing the medium with an (N+1)th, updated table to replace the provided (N)th table on the medium and comprising:
obtaining the (N+1)th table 64 with an (N+1)th key-set of (RND), (PU-PM), and (PR-PM) from the cache;
obtaining the ID of the medium therefrom;
appending the obtained ID of the medium to the (N+1)th table;
obtaining the (N+1)th key-set from the (N+1)th table;
obtaining the (N)th key-set from the (N)th table on the medium and if present a daisy chain of previous key-sets in the (N)th table, each prior (RNDn) in the daisy chain being encrypted according to an immediately following (RNDn) to form a series of links, each link in the daisy chain also having a corresponding (RNDn(PR-PMn);
extending the obtained daisy chain by adding the (N)th (RNDn) thereto encrypted according to the (N+1)th (RNDn) as another link in the daisy chain, and adding the corresponding (RNDn(PR-PMn);
adding the extended daisy chain to the (N+1)th table;
adjusting the (N+1)th table to include old (PU-PDx (RNDn)s for invalidated (PU-PDx)s and assigning a version number n to each entry;
tying the (N+1)th table to the medium by the ID of the medium and the obtained (N+1)th secret; and
copying the adjusted (N+1)th table to the medium to replace the (N)th table thereon.

8. The method of claim 7 wherein tying the table to the medium comprises appending to the table a signature based at least in part on the ID of the medium and (RND).

9. The method of claim 7 wherein tying the table to the medium by the ID of the medium comprises encrypting the ID according to (RND) and appending the encrypted ID to the table.

10. The method of claim 7 comprising obtaining the table from a cache having a plurality of tables, each being based on a different key-set of (RND), (PU-PM), and (PR-PM).

11. The method of claim 7 further comprising assigning a version number to the table.

12. The method of claim 1 wherein tying the (N+1)th table to the medium comprises appending to the (N+1)th table a signature based at least in part on the ID of the medium and (RND).

13. The method of claim 7 wherein tying the (N+1)th table to the medium by the ID of the medium comprises encrypting the ID according to the obtained (N+1)th (RNDn) and appending the encrypted ID to the (N+1)th table.

14. The method of claim 7 wherein each entry in the (N)th table further includes a version number n of the corresponding encrypted (RNDn), and wherein adjusting the (N+1)th table to include old secrets for invalidated device keys (DK) and assigning a version number n to each entry comprises:
determining from the (N+1)th table which (PU-PDx)s employed therein are invalidated;
populating the entry in such (N+1)th table for each invalidated (PU-PDx) with the corresponding entry in the (N)th table, along with the version number n of such corresponding entry;
assigning the version number n of the (N+1)th table to all entries therein not populated from the (N)th table and therefore still valid, whereby a valid device with a valid (PU-PDx) can access the latest ((N+1)th)(RNDn) of the (N+1)th table, and an invalidated device with an invalidated (PU-PDx) can access a corresponding (RNDn) in the (N+1)th table that is earlier to the (N+1)th secret, and whereby with the accessed (RNDn), the device can by extension access all earlier (RNDn)s in the daisy chain, but not any later (RNDn)s.

15. A method performed in combination with a device having a public-private key pair (PU-PD, PR-PD), the device for receiving a storage medium or having the storage medium, the storage medium having a public-private key pair (PU-PM, PR-PM) and having stored thereon digital content encrypted by a content key (KD) (KD(content)), a digital license corresponding to the content including (KD) encrypted by (PU-PM) (PU-PM(KD)), and a table including a plurality of entries therein, each entry including (PR-PM) encrypted by a (PU-PD) of one of a plurality of devices (PU-PD(PR-PM)), the method for the device to render the content on the medium and comprising: receiving a request to render the content on the medium; obtaining the table from the medium; obtaining (PR-PD); indexing into an entry of the table based on the obtained (PR-PD); obtaining (PU-PD(PR-PM)) from the indexed-into entry of the table; applying (PR-PD) to (PU-PD(PR-PM)) to expose (PR-PM); obtaining (PR-PM(KD)) from the license; applying (PR-PM) to (PU-PM(KD)) to expose (KD); obtaining (KD (content)) from the storage medium; applying (KD) to (KD(content)) to expose the content; and rendering the exposed corresponding content, wherein the device has a public-private key pair (PU-PDx, PR-PDx) with a pre-selected index value x, and wherein each entry of the table includes (PR-PM) encrypted by a (PU-PDx) of one of a plurality of devices (PU-PDx(PR-PM)) and an index value x thereof, the method comprising: obtaining (PR-PDx) and the index value x; indexing into an entry of the table based on the obtained index value x; obtaining (PU-PDx(PR-PM)) from the indexed-into entry of the table; and applying (PR-PDx) to (PU-PDx(PR-PM)) to expose (PR-PM), wherein the table on the medium is updated periodically to have a new key-set including (PU-PM) and (PR-PM) and has a daisy chain of prior key-sets, each prior (PR-PMn) in the daisy chain being encrypted according to an immediately following (PR-PMn) to form a series of links, and where each entry of the table includes the new (PR-PMn) or one of the prior (PR-PMn)s encrypted according to a (PU-PDx) of one of a plurality of devices, an index value x, and a version number n for the encrypted (PR-PMn) of the entry, and wherein the content to be rendered has a version number m corresponding to the secret in the daisy chain protecting such content, the method comprising: determining the version number m of the content; selecting the encrypted secret from the indexed-into entry; obtaining (PU-PDx(PR-PMn)) and the corresponding version number n of such (PR-PMn) from the indexed-into entry of the table; applying (PR-PDx) to (PU-PDx(PR-PMn)) to expose (PR-PMn); determining based on the version number n of (PR-PMn) an entry point into the daisy chain; traversing back from the entry point of the daisy chain to expose the (PR-PMm) corresponding to the version number m of the content; and applying the exposed (PR-PMm) to expose (KD), wherein a device may traverse the daisy chain from the entry point to obtain earlier secrets but not later secrets.

16. The method of claim 15 wherein the device has a plurality of public-private key pairs (PU-PDx, PR-PDx), each with a pre-selected index value x, the method comprising:
    obtaining each (PR-PDx) and the index value x thereof; for each (PR-PDx);
    indexing into an entry of the table based on the corresponding obtained index value x;
    obtaining (PU-PDx(PR-PM)) from the indexed-into entry of the table; and
    applying (PR-PDx) to (PU-PDx(PR-PM)) to expose (PR-PM);
    until (PR-PM) is in fact exposed.

17. The method of claim 15 wherein the medium includes an ID thereof thereon and the table includes the ID of the medium stored therein, wherein the table is tied to the medium by the ID, the method further comprising:
    obtaining the ID of the medium therefrom;
    obtaining the ID of the medium as stored in the table;
    comparing the obtained IDs and proceeding only if the IDs match.

18. The method of claim 17 wherein the table includes a signature based at least in part on the ID of the medium as stored therein, the method further comprising verifying the signature to verify the ID.

19. The method of claim 17 wherein the table includes the ID of the medium encrypted according to the secret as exposed, the method comprising obtaining the ID by applying the secret to the encrypted ID to reveal same.

20. The method of claim 15 further comprising:
    determining based on the version number n of (PR-PMn) and the version number m of the content whether the secret can be employed to render the content, and
    proceeding only if the version number n of (PR-PMn) is not lower than the version number m of the content and therefore can be employed to render the content.

21. A method performed in combination with a host computer and a plurality of devices each having a public-private key pair (PU-PD, PR-PD), each device for receiving a storage medium or having the storage medium, the storage medium including an ID thereof thereon and having a public-private key pair (PU-PM, PR-PM) and for having stored thereon digital content encrypted by a content key (KD) (KD(content)), a digital license corresponding to the content including (KD) encrypted by (PU-PM)(PU-PM (KD)), and a table including a plurality of entries therein, each entry including (PR-PM) encrypted by a (PU-PD) of one of a plurality of devices (PU-PD(PR-PM)), the method for the host computer to provide the medium with the table and comprising:
    obtaining the table from a cache;
    obtaining the ID of the medium therefrom;
    appending the obtained ID of the medium to the obtained table;
    employing a (PR-PD) to find the corresponding entry in the obtained table and expose (PR-PM);
    tying the table to the medium by the ID of the medium and (PR-PM); and
    copying the tied table to the medium,
    wherein each device has a public-private key pair (PU-PDx, PR-PDx) with a pre-selected index value x, and wherein each entry of the table includes (PR-PM) encrypted by a (PU-PDx) of one of a plurality of devices (PU-PDx(PR-PM) and an index value x thereof, the method comprising employing a (PR-PDx) and the index value x thereof to find the corresponding entry in the obtained table and expose (PR-PM),
    wherein the provided table is an (N)th table, the method further comprising the host computer providing the medium with an (N+1)th, updated table to replace the provided (N)th table on the medium and comprising:
    obtaining the (N+1)th table 64 with an (N+1)th key-set of (PU-PM) and (PR-PM) from the cache;
    obtaining the ID of the medium therefrom;
    appending the obtained ID of the medium to the (N+1)th table;
    obtaining the (N+1)th key-set from the (N+1)th table;
    obtaining the (N)th key-set from the (N)th table on the medium and if present a daisy chain of previous key-sets in the (N)th table, each prior (PR-PMn) in the daisy chain being encrypted according to an immediately following (PR-PMn) to form a series of links;
    extending the obtained daisy chain by adding the (N)th (PR-PMn) thereto encrypted according to the (N+1)th (PR-PMn) as another link in the daisy chain;
    adding the extended daisy chain to the (N+1)th table;
    adjusting the (N+1)th table to include old (PU-PDx(PR-PMn)s for invalidated (PU-PDx)s and assigning a version number n to each entry;
    tying the (N+1)th table to the medium by the ID of the medium and the obtained (N+1)th secret; and copying the adjusted (N+1)th table to the medium to replace the (N)th table thereon.

22. The method of claim 21 wherein tying the table to the medium comprises appending to the table a signature based at least in part on the ID of the medium and (PR-PM).

23. The method of claim 21 wherein tying the table to the medium by the ID of the medium comprises encrypting the ID according to (PR-PM) and appending the encrypted ID to the table.

24. The method of claim 21 comprising obtaining the table from a cache having a plurality of tables, each being based on a different key-set of (PU-PM) and (PR-PM).

25. The method of claim 21 further comprising assigning a version number to the table.

26. The method of claim 21 wherein tying the (N+1)th table to the medium comprises appending to the (N+1)th table a signature based at least in part on the ID of the medium and (PR-PM).

27. The method of claim 21 wherein tying the (N+1)th table to the medium by the ID of the medium comprises encrypting the ID according to the obtained (N+1)th (PR-PMn) and appending the encrypted ID to the (N+1)th table.

28. The method of claim 21 wherein each entry in the (N)th table further includes a version number n of the corresponding encrypted (PR-PMn), and wherein adjusting the (N+1)th table to include old secrets for invalidated device keys (DK) and assigning a version number n to each entry comprises:

determining from the (N+1)th table which (PU-PDx)s employed therein are invalidated;

populating the entry in such (N+1)th table for each invalidated (PU-PDx) with the corresponding entry in the (N)th table, along with the version number n of such corresponding entry;

assigning the version number n of the (N+1)th table to all entries therein not populated from the (N)th table and therefore still valid, whereby a valid device with a valid (PU-PDx) can access the latest ((N+1)th)(PR-PMn) of the (N+1)th table, and an invalidated device with an invalidated (PU-PDx) can access a corresponding (PR-PMn) in the (N+1)th table that is earlier to the (N+1)th secret, and whereby with the accessed (PR-PMn), the device can by extension access all earlier (PR-PMn)s in the daisy chain, but not any later (PR-PMn)s.

* * * * *